INVENTOR

IMRE ZAKARIAS

BY Young, Emery & Thompson

ATTORNEYS

INVENTOR

IMRE ZAKARIAS

BY Young, Emery & Thompson

ATTORNEYS

United States Patent Office
2,880,345
Patented Mar. 31, 1959

2,880,345

ELECTRON DISCHARGE TUBES ADAPTED TO AMPLIFY VOLTAGES OF VERY HIGH FREQUENCY

Imre Zakariás, Budapest, Hungary, assignor to Egyesült Izzólámpa és Villamossági Részvénytársaság, Budapest, Hungary, a firm Application May 16, 1956, Serial No. 585,299
Claims priority, application Hungary May 20, 1955
4 Claims. (Cl. 313—107)

This invention relates to improvements in multigrid electron discharge tubes operating in a high vacuum, and particularly to improvements in amplifier tubes of the type specified adapted to be operated as voltage amplifiers for amplifying voltages of very high frequency.

It is well known to those skilled in the art that the capacitance between the control-grid and the plate of up-to-date multigrid amplifier tubes constructed as high-frequency pentodes has a very small value, generally lower than 0.01 pf., and, in consequence thereof, the coupling of the tuned circuits connected to the control-grid and to the plate, respectively, is very loose. Owing to this, the voltage amplification factor, i.e. the gain of voltage amplification, which can be obtained by means of a single tube, may be very large, gains of 100 to 200 being obtainable without the danger of self-excitation, and therefore such voltage amplification is broadly practised in the medium-frequency stages, working with frequencies of the range of about 0.5 mc./s., of radio receiving sets of conventional design.

It is further well known that in case of the amplification of voltages of very high frequency, especially those of a frequency exceeding 20 mc./s., the small value of the capacitance between the control-grid and the plate of the amplifying tubes mentioned above is, in itself, not sufficient to ensure the looseness of coupling between the tuned circuits connected to these electrodes necessary to avoid the danger of self-excitation. It has been ascertained that the reason of this drawback consists partly in the fact that in the case of very high frequencies the major part of the tuning capacitance of the tuned circuits is constituted by the input and output capacitances of the amplifier tube. This is true especially in the case of the intermediate frequency broad-band amplification of television receiving sets. It has further been ascertained that a further reason of the drawbacks mentioned above consists in the fact that the inductance of the lead-in wires of the grounded electrodes adjacent to the control-grid and to the plate, as well as the inductances of the lead-in wires of the cathode, the screening-grid, the suppressor-grid and the screening means such as shields constitute, in the case of very high frequencies, an impedance which is by no means negligible. In consequence of this fact, in case of such very high frequencies, the capacitances and mutual inductances present between the lead-in conductors of the control-grid respectively the plate and the cathode, the suppressor grid, the screening means and the screening grid cause a substantially tighter coupling between the tuned circuits, as is caused by the usual small capacitance between the control-grid and the plate in case of moderately high frequencies.

In consequence of these facts the first tuning of the so called "detuned" stages of the intermediate-frequency broad-band amplifiers usual in television receiving sets is a complicated and tedious operation. A further important drawback is that this tuning has to be performed again on occasion of each changing of the amplifier tubes in question. This is due to the fact that according to my own experience as well as to the technical literature of this art the tuning of the different tuned circuits is not independent of each other, and, in consequence thereof, the characteristic curve of transmission changes on occasion of the changing of the amplifier tube, as a result of the unavoidable divergences of the inductances and capacitances of the component parts of different individual amplifier tubes, determining the coupling of each individual tube.

I have further ascertained that, in case of such very high frequencies, the values of the capacitances and mutual inductances present between the component parts of the amplifier tubes are mainly dependent on the relative arrangement of the lead-in conductors of the tube, and this discovery is the basis of my present invention.

In the present specification and claims the expression "lead-in conductors" is intended to include the lead-in wires airtightly sealed into the bulb of the tube as well as their connecting means, such as contact pins, studs or the like, to which they are permanently connected, usually inside the bulb of the tube or inside the base or cap of the tube.

It is an object of the invention to provide an electron discharge tube by means of which the voltage amplification of voltages of very high frequency, surpassing 5 mc./s., can be accomplished as simply and reliably and can be controlled with the same ease and safety, as it is possible in the case of voltages of moderately high frequency, that is to say below 5 mc./s., by means of conventional up-to-date high-frequency pentodes.

It is further object of the invention to provide an electron discharge tube adapted to the voltage amplification of voltages of very high frequency, which is relatively simple of design, easy to manufacture, and can be adjusted to very narrow limits of tolerance as regards to the inter-electrode capacitances determining the suitability of the tube for said amplification in consequence of its substantially reduced inter-electrode capacitances.

According to the invention, these results are obtained mainly by a new and special relative arrangement of the lead-in conductors of the tube, but in connection therewith and in addition thereto other expedients adapted to reduce the inter-electrode capacitances of the tube may also be employed, as will be explained hereinafter.

The general rule according to which the lead-in conductors of the tube have to be arranged according to the invention can be derived from my discovery of the fact that in order to obtain the results aimed at by the invention is is not sufficient to lessen the capacitance between the lead-in conductors of the plate and the control-grid, usually the grid adjacent to the cathode, in a known manner, by arranging said lead-in conductors as far as possible from each other and eventually providing also shielding means between them, but, in addition to this known expedient, the lessening of the capacitances and mutual inductances between the lead-in conductors of other electrodes and parts has also to be effected.

In order to ascertain the general rule according to which the lead-in conductors have to be arranged in relation to each other according to the invention, the lead-in conductors of the electrodes and shielding means of the tube have to be, first of all, classified into three classes. The lead-in conductors of the first class comprise the lead-in conductors of such electrodes, which, in the art of high-frequency voltage amplification, are usually termed as "hot points" of the system. These electrodes are the electrodes intentionally provided with high-frequency voltage during amplification, such as the control-grid and the plate. The lead-in conductors of the second class comprise those connected to such parts of the tube, which are usually termed as "cold points" of the system, as they have to be held devoid of high-frequency voltages as far as possible, such as for example the suppressor grid, the screening grid and the screening means and the lead-in conductors of the cathode. The lead-in conductors of the third class comprise lead-in conductors, the arrangement of which in relation to each other as well as in relation to the other lead-in conductors is of secondary importance or even substantially immaterial from the point of view of the invention, such as for example the lead-in conductors supplying heating current to the cathode. From the point of view of the invention, the lead-in conductors of the tube may be considered as constituting two groups, each of these usually consisting of lead-in conductors arranged side by side in the base of the tube, in case of tubes of conventional design, but the invention is not limited to this kind of tubes having all their connections arranged on the base of the tube. Each of these groups comprises at least one lead-in conductor of the first class, at least one of the second class and one of the groups may also comprise all the lead-in conductors of the third class mentioned above. The two said groups comprise their lead-in conductors in such a selection that each of said groups contains only the lead-in conductor of the same hot point of the system, i.e. either of the plate or of the control grid. In addition to this hot-point lead-in conductor, each group contains preferably all the cold-point lead-in conductors correlated to its hot-point lead-in conductor, that is to say, the group containing the lead-in conductor of the control-grid contains the lead-in conductors of the screen grid and the lead-in conductor of the cathode correlated to it, and the group containing the lead-in conductor of the plate contains the lead-in conductors of the suppressor-grid and of the screening means, and another lead-in conductor of the cathode, correlated to these. The lead-in conductors of the heating filament of the cathode may be considered to belong to either of these groups or to constitute a "neutral zone" separating the lead-in conductors of the two groups from each other, belonging thus to neither of the two groups.

In this connection, it has to be stated that the invention relates to tubes provided with at least two lead-in conductors for their cathode, but also other electrodes or parts of the tube may be provided with a plurality of lead-in conductors instead of a single one, in order to lessen the mutual inductance of the lead-in conductors, and these lead-in conductors may be connected to identical of different point of the electrode or shielding means to or from which they are intended to supply voltage. The individual lead-in conductors always belong to the class specified above which is determined by the electrode or part to which they are connected.

The "general rule" according to which the lead-in conductors of the tube have to be arranged in relation to each other according to the invention is that the arrangement, besides assuring, according to the requirement well known in this art, small capacitance between the hot point lead-in conductors of the two groups, should also, according to the invention, assure that the caacitance between a hot point lead-in conductor of one of the group termed as "first group" and at least one cold point lead-in conductor of the other group termed as "second group" as well as the capacitance between the hot point lead-in conductor of the second group and at least one of the cold point lead-in conductors of the first group, and preferably the capacitance between the hot point lead-in conductor of the first group and all the cold point lead-in conductors of the second group as well as the capacitance between the hot point lead-in conductor of the second group and all the cold point lead-in conductors of the first group should be reduced to a suitably low value, preferably to be as small as possible, for example in the case of voltage amplifier tubes of conventional design and size below the value of 0.2 pf. each.

In this connection it is to be remarked that if either the first or the second group should contain two lead-in conductors connected to the same hot point electrode, either of these lead-in conductors constitutes a hot point of the group in question referred to above.

Assuring small capacitances, and, simultaneously also small mutual inductances between the lead-in conductors is accomplished in a manner known in itself, by arranging these conductors in suitable distance from each other and eventually also by providing shielding means between them.

The general rule above disclosed specifies which of the individual lead-in conductors have to be spaced from, and eventually also shielded against, each other in order to obtain the result aimed at by the invention. Thus, in order to comply with the requirements of the general rule, the arrangement has to follow the specific rule prohibiting the positioning of any hot point lead-in conductor of the first group adjacent to any hot point lead-in conductor of the second group, and also the positioning of any cold point lead-in conductor correlated to the hot point lead-in conductor of its own group adjacent to any hot point lead-in conductor of the other group. This simple specific rule allows also the easy identification of the tubes according to the invention by ascertaining the relative positions of their lead-in conductors, because, according to the invention, every hot point lead-in conductor of either of the two groups of lead-in conductors is positioned apart from every hot point lead-in conductor of the other group and also positioned apart from all the cold point lead-in conductors correlated to any hot point lead-in conductor of the other group. The expression "positioned apart" is intended, in the present specification and claims, to indicate that the lead-in conductors in question are not adjacent to each other, but separated from each other in a manner to ensure small mutual capacitances and inductances between them, as already set forth above in detail.

In the usual case of tubes having all their lead-in conductors arranged in the base of the tube, the relative arrangement of the lead-in conductors is preferably such that the said two groups comprising lead-in conductors arranged side by side on the periphery of a closed curve such as a circle are separated from each other on one of their adjacent ends by a suitable distance or gap, preferably broader than any of those of preferably equal widths separating the individual lead-in conductors of both of said groups from each other, and on their other adjacent end by a "neutral zone" constituted by at least one of the lead-in conductors belonging to the third class specified above.

The arrangement of the lead-in conductors connected to contact-pins arranged circularly on a common base is therefore, in the case of high-frequency pentodes of generally conventional design, preferably such that each of the two groups of lead-in conductors contains, as the lead-in conductor adjacent to the lead-in conductor of the other group, a lead-in conductor belonging to the third class specified above, these adjacent lead-in conductors of the third class forming the "neutral zone" referred to above, and, in addition to the lead-in conductor of the third class, contains a "hot point" lead-in conductor, and also one of the lead-in conductors of the cathode, the latter conductor being preferably positioned so as to constitute the other extreme bordering lead-in conductor of one of said groups, separated from the extreme bordering lead-in conductor of the other group by a gap broader than those of preferably equal widths separating the individual lead-in conductors of both of said groups from each other.

It is, however, to be clearly understood that the invention is not limited to tubes having all their lead-in conductors arranged on or inside a common base or cap fastened to the bulb of the tube on the end of the same, as the teachings and general principles of the invention may be applied advantageously also to tubes differing in construction from those of the conventional type provided with all their lead-in conductors fastened to a common insulating base or cap, notwithstanding the fact that the most striking results may be obtained by applying the teachings of the invention to this conventional type of tubes.

In addition to the diminishing of the interelectrode capacitances obtained by arranging the lead-in conductors according to the invention, these capacitances may be further diminished by suitable arrangement and construction of the electrodes of the tube. It has been found advantageous, for example, to lessen the capacitance between the screening grid and the plate by using a suppressor-grid of increased screening power, i.e. an increased ratio of the electron-impermeable to the electron-permeable parts of its surface interposed between the screening-grid and the plate. This ratio may be conveniently expressed by stating the controlling power of the grid in ma./volt, the the numerical value of this factor being usually about 0.1 to 0.2 in case of suppressor-grids of conventional construction, whereas, according to the invention, the suppressor grids of the tubes according to the invention are preferably constructed so as to possess a controlling power exceeding 0.5 ma./volt.

The numerical value of the inter-electrode capacitance reduced according to the invention, which has been stated above to be preferably below 0.2 pf., depends on many circumstances, and may, in case of very high frequencies, be substantially lower, for example 0.1 or even 0.05 pf., according to the size and construction of the individual tube. The invention may, however, be also applied to tubes of substantial size, and result in a very considerable diminution of their inter-electrode capacitances, for example from 5 pf. of the conventional tube to 1 or even 0.5 pf. of the tube of identical size, when its lead-in conductors are arranged and screened and their electrodes constructed and arranged according to the teachings of the invention.

The invention will be best understood by reference to the following detailed description taken in connection with the accompanying drawings, in which Fig. 1 is a diagram adapted to illustrate the general arrangement of a pentode and the classification of its parts and lead-in conductors into the classes and groups referred to above.

Figures 2 to 5, inclusive, show examples of the relative arrangement of the lead-in conductors of the tube shown by Fig. 1, arranged according to the invention.

Fig. 6 shows the general arrangement of a tetrode, and

Figures 7 and 8 examples of the relative arrangement of the lead-in conductors of the tetrode shown by Figure 6, and finally Fig. 9 shows a view of the pentode of Figure 1, with its lead-in conductors arranged according to Fig. 4.

Referring now to Fig. 1, this figure shows a high-frequency pentode of generally conventional design, its highly evacuated bulb 5 containing an indirectly heated cathode 6 provided with the lead-in wires 7 and 8, a plate 9, a control-grid 10, a screening-grid 11, a suppressor grid 12, and screening means 13. The plate 9 is connected outside of the tube to the coil 14 of its tuned circuit, the capacitance of which is constituted by the capacitance of its wiring and of the electrodes, the conventional by-pass capacitor 21 being only provided to prohibit the direct-current plate voltage from reaching the cathode. The control-grid is connected, outside of the tube, to the coil 15 of its tuned circuit, the capacitance of which is also constituted by the capacitance of its wiring and of the electrodes. The purpose of the conventional by-pass capacitor 20 is similar to that of capacitor 21. Heating current is being supplied to the cathode 6 through the lead-in wires 18 and 19 in a conventional manner.

One of the "hot points" of this system is the plate 9, and the other the control-grid 10, and therefore their lead-in conductors belong to the first class specified above, the lead-in conductors of the parts 6, 11, 12 and 13 belonging to the second class, and the lead-in wires 18 and 19 to the third class specified above, and accordingly one of the "cold points" of the system is the point 16, and the other the point 17. Accordingly, the first group of lead-in conductors specified above may comprise the lead-in conductors of the control-grid 10, of the screening-grid 11, and the lead-in wire 7, whereas the second group may comprise the lead-in conductors of the plate 9, of the suppressor-grid 12 and of the screening means 13 as well as the lead-in wire 8 and lead-in wires 18 and 19 may belong to either of said groups or be considered to constitute a "neutral zone" separating the said groups.

According to the invention, these lead-in conductors have to be arranged in such a manner that the arrangement, beside assuring small capacitance between the lead-in conductors of the electrodes 9 and 10, should also assure that the capacitance between the "hot-point" lead-in conductor of the control-grid 10 and those connected to the "cold point" 17, as well as the capacitance between the "hot-point" lead-in conductor of the plate 9 and those connected to the other "cold-point" 16 should also be as small as possible, preferably below 0.2 pf.

Examples of arrangements ensuring this are shown by Figures 2 to 5 inclusive, representing diagrammatical cross-sections through the base of the tube and bearing all the contact-pins to which all the lead-in conductors, such as wires, of the tube are connected. On these figures, the references $C_1$ and $C_2$ designate the lead-in conductors of the cathode 6, i.e. those corresponding to wires 7 and 8, respectively, of Fig. 1, $C_3$ designating an eventual third lead-in conductor of the cathode 6. The reference A designates the lead-in conductor of the plate 9, the references $F_1$ and $F_2$ the lead-in wires of the heating current, corresponding therefore to wires 18 and 19, respectively, of Fig. 1, and the reference S the lead-in conductor of the screening means 13. The references $G_1$, $G_2$ and $G_3$ designate the lead-in conductors of the grids 10, 11 and 12, respectively, the reference $G_2'$ designating an eventual second lead-in conductor of the screening-grid 11. The references $S+G_3$ designate an eventual lead-in conductor common to the screening means 13 and the suppressor-grid 12. The outer circles of the Figures 2 to 5 are intended to designate the circumference of the base, and the inner circles the cross-sections of the contact pins to which the lead-in wires designated by the references above are connected.

In the arrangement of Fig. 2 the first group of lead-in conductors comprises the "hot-point" conductor $G_1$, as that of the first class, the "cold-point" conductors $C_1$ and $C_2$ ($C_1$ representing in this case a conductor of the second class, as well as $C_2$), and the conductors $F_1$ and $F_2$ of the third class, whereas the second group comprises the other "hot-point" conductor A, as that of the first class, the "cold-point" conductors $G_3$ and S of the second class. In this arrangement, the capacitance between the conductors A and $G_2$ has been reduced to a small value of preferably below 0.2 pf. by the interposition of the conductor $G_3$ between A and $G_2$, but the grouping is not yet perfect, as the conductors of the two groups, separated on one of their ends from each other by the "neutral zone" constituted by conductors $F_1$ and $F_2$, are not separated from each other on their other end by a gap broader than those separating the lead-in conductors of the same groups, this broad gap being present between the conductors $C_2$ and $G_3$ of the first group. In spite of this fact, the arrangement ensures reduced capacitances between the conductors of the two groups.

In the arrangement of Fig. 3 the first group comprises the "hot-point" lead-in conductor $G_1$, the "cold-point" lead-in conductors $G_2$ and $G_2'$ and the lead-in conductor $F_1$ and $F_2$ as lead-in conductors of the first, second and third classes, respectively. The second group comprises, as lead-in conductors of classes of the same sequence, the lead-in conductors A, S+$G_3$, $C_2$, $C_1$. The two groups are separated from each other on one of their ends by the same "neutral zone" as that of Fig. 2, and on their other end by the broad gap present between the conductors $G_2'$ and $C_1$. This arrangement also ensures reduced capacitances between the conductors $G_2$ and A, as well as between the conductors $G_1$ and S+$G_3$, besides assuring, as well as the arrangement of Fig. 2, small capacitance between the conductors $C_1$ and A, the capacitance between the conductors $G_1$ and S+$G_3$ being preferably reduced to less than 0.2 pf.

In the arrangement of Fig. 4 the first group comprises the conductors $G_1$, $G_2$ and $C_1$ and eventually $F_1$ and $F_2$ as conductors of the first, second and third classes, respectively. The second group comprises, as conductors of the first and second classes, the conductors A, S+$G_3$, $C_2$, $C_3$. The separation of the two groups is substantially identical to that shown by Fig. 3, but the arrangement is still better. The distance between the conductors $G_2$ and A, as well as the distance between the conductors $G_1$ and S+$G_3$ are great enough to ensure reduced capacitances of preferably below 0.2 pf. between the conductors of these pairs, but also the capacitance between the conductor $C_1$ and the conductor $C_2$, as well as the capacitance between the conductors $G_1$ and the conductors $C_2$ and $C_3$ is very small, preferably below 0.2 pf.

The arrangement of Fig. 5 differs from that of Fig. 4 only in that the cathode has only two lead-in conductors instead of the three of Fig. 4, and accordingly the lead-in conductor $G_3$ takes the place of conductor $C_3$ of Figure 4, separated from the lead-in conductor S of the screening means. This arrangement, therefore, has the same advantages as that of Fig. 4, but ensures them without necessitating a third lead-in conductor for the cathode, and in consequence of this is eminently adapted for tubes of generally conventional structure and design. In this arrangement, it may be seen quite clearly that, from the point of view of primary importance, the first group of conductors comprises the lead-in conductors $G_2$, $G_1$ and $C_1$, whereas the second group comprises the lead-in conductors $G_3$, $C_2$, A and S, as the lead-in conductors $F_1$ and $F_2$ may either be considered to belong to either of these groups, or to constitute the "neutral zone" separating the two groups from each other, these lead-in conductors being of secondary importance as regards to the point of view of the invention. In the first of the two groups, lead-in conductor $G_1$ represents one of the hot-points of the pentode, namely the control-grid 10 of the tube. The lead-in conductors $G_2$ and $C_1$ represent the cold point lead-in conductors correlated to the hot point lead-in conductor $G_1$, as the capacitances between the control-grid 10, and the cathode 6 and the grids 10 and 11 are the greatest. In the second group of lead-in conductors, the lead-in conductor A represents the second hot point of the tube, namely the plate 9. Correlated to this second hot point lead-in conductor A are the cold point lead-in conductors $G_3$ and S, in view of the capacitances between the plate 9 and the suppressor grid 12 on the one hand and between the plate 9 and the screening means 13 on the other hand. These correlations are substantially unaffected by the capacitance of the cathode 6 to the other electrodes of the tube, and therefore the arrangement of the lead-in conductors of the cathode may be any convenient one in the two groups, as shown by the comparison of the arrangements shown by Figures 2, 3, 4 and 5.

Referring now to Fig. 6, this figure shows the general arrangement of a tetrode, differing from the pentode shown by Fig. 1 only in that instead of the suppressor-grid 12 of the pentode this tetrode contains the deflecting means 12*a*, provided with the lead-in conductor D and that its cathode 6 is provided with a third lead-in conductor $C_3$, the other references identical with those of Fig. 1 indicating parts substantially identical in both of said tubes.

Figure 4:
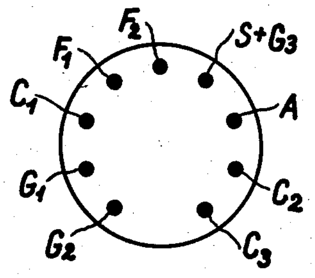
Figure 5:
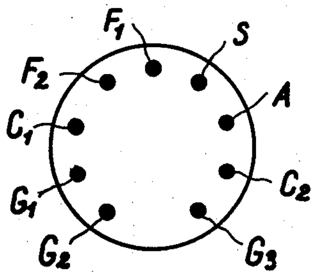
Figure 6:
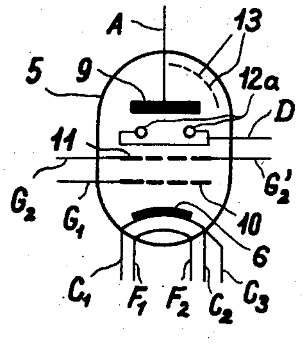
Figure 7:
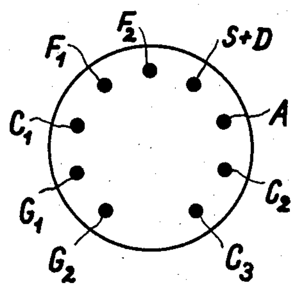
Fig. 7 shows an example of the arrangement of the lead-in conductors of the tube shown by Fig. 6, substantially identical with that shown by Fig. 4, with the difference, due to the different structures of the tubes, that the lead-in conductor S+$G_3$ of Fig. 4 is substituted by the lead-in conductor S+D in Fig. 7.
Figure 8:
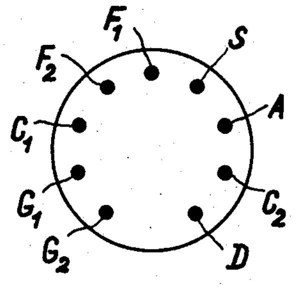
Fig. 8 shows another example of the arrangement of the lead-in conductors of the tube shown by Fig. 6, substantially identical with that shown by Fig. 5, with the difference that the lead-in conductor $G_3$ of Fig. 5 is substituted by the lead-in conductor D in Fig. 8.

By arranging, according to the invention, the lead-in conductors according to Figures 7 and 8, substantially the same advantages may be obtained as by the arrangements shown by Figures 4 and 5.

Figure 1:
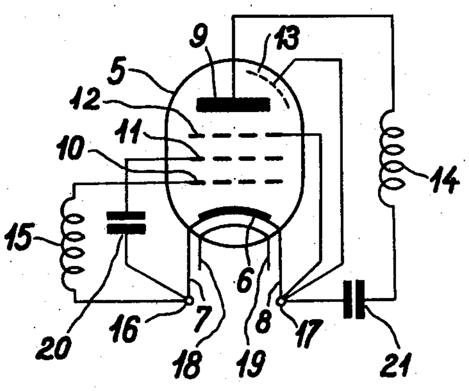
Figure 2:
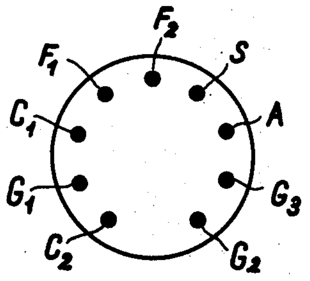
Figure 3:
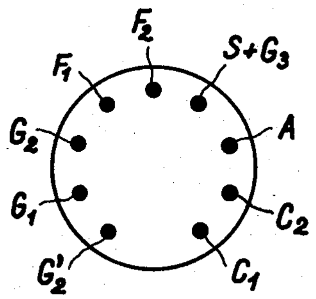
Figure 9:
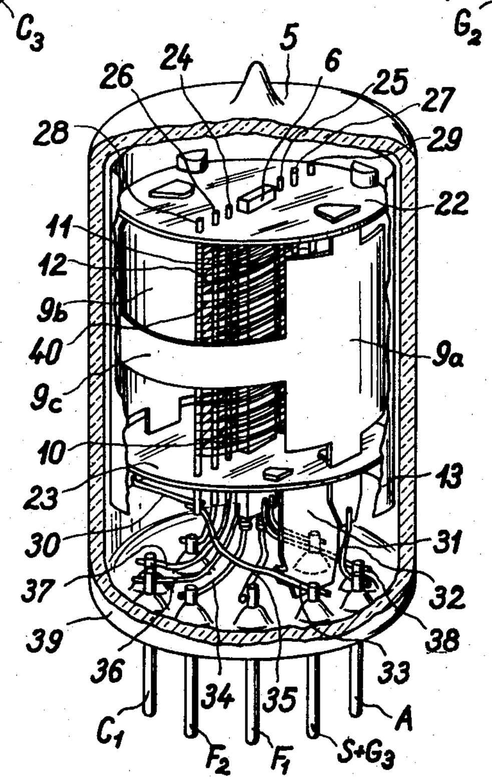

Figure 9 shows, in an enlarged scale, a perspective view of the pentode shown by Fig. 1, its lead-in conductors being arranged according to Fig. 4, with a part of the bulb 5 and of the screening means 13 broken away for the sake of clear illustration. The general arrangement of this tube is conventional, all the electrodes being held by the insulating plates 22 and 23. The supporting rods 24 and 25 of the control grid 10, as well as the supporting rods 26 and 27 of the screening grid 11 and the supporting rods 28 and 29 of the suppressor grid 12 are located in the plane of the flat cathode 6. The plate consists of the cylindrically curved parts 9*a* and 9*b* located opposite to the flat surfaces of the cathode 6, and integral with their cylindrically curved connecting strips, of which strip 9*c* can be seen on the drawing. This shape of the plate results in a reduced capacitance between the plate and the other electrodes, without appreciable loss of plate current. The screening means 13 consist of a metallic cylinder surrounding the whole set of electrodes, and is connected electrically to the suppressor-grid 12 by the metallic strip 30 welded to a suitable extension of the cylinder and to rod 28. The screening plate 31, intended to screen the wire 32 connecting the plate 9 with the contact-pin A is also connected to the screening means 13 by being welded to the wire 33 connecting rod 28 with contact-pin S+$G_3$. Wires 34 and 35 supply heating current to the cathode 6, being connected by the contact-pins $F_2$ and $F_1$, respectively, and wire 36 connects the cathode 6 with the contact-pin $C_1$. The other contact-pins of the tube shown on Fig. 4 but not wholly visible on Figure 9 are connected to their electrodes in a similar manner, the wire 37 connecting rod 24 to contact pin $G_1$ being shown on Fig. 9, as well as the end of the wire 38 connecting the cathode 6 with the contact-pin $C_2$. All the contact pins of the tube are airtightly sealed into the glass base plate 39 fused to the bulb 5 of the tube in a conventional manner, and arranged circumferentially as usual.

In Fig. 9, the suppressor-grid 11 of generally conventional design consists of a helically wound wire 40, fastened to the rods 28 and 29 in the usual manner and wound with its adjacent turns very near to each other, so as to constitute a grid having a controlling power surpassing 0.5 ma./volt, amounting for example to about 1.5 ma./volt, this result being achieved by using a wire 40 of a diameter of about 0.05 mm., the adjacent turns of which are spaced about 0.35 mm. apart from each other.

It has to be pointed out that the embodiments described above and shown on the drawings are to be taken only as illustrative examples and by no means limitative as regards the invention. The invention may be embodied in a great variety of tube structures, without thereby departing from its spirit disclosed by the general rule specified above and easily complied with by arranging the lead-in conductors according to the specific rule that no hot-point lead-in conductor of the first group should be adjacent to a hot-point lead-in conductor of the second group, and no cold-point conductor correlated to the hot-point lead-in conductor of its group should be adjacent to a hot-point conductor of the other group, and without sacrificing any of the advantages which can be obtained by suitable application of these rules, resulting in an improved amplifier tube.

What I claim is:

1. An electron discharge tube comprising an envelope having as elements an anode, a suppressor grid, a screen grid, a control grid, and a cathode contained therein, lead-in conductors provided for each of said elements and arranged in first and second groups spaced from each other, said first group comprising said control grid and said cathode lead-in conductors, said second group comprising said anode, said suppressor grid and said screen grid lead-in conductors, said anode and said control grid lead-in conductors being arranged in diametrically opposed relation, and said anode and said screen grid lead-in conductors having at least one other lead-in conductor interposed therebetween.

2. An electron discharge tube as described in claim 1 further comprising a filament having a pair of lead-in conductors located between said first and second groups and forming a neutral zone therebetween.

3. An electron discharge tube as described in claim 1 in which the suppressor grid has a relatively high ratio of electron-impermeable to electron-permeable parts of its surface, whereby the controlling power of the suppressor grid exceeds 0.5 ma./volt.

4. An electron discharge tube comprising an envelope having as elements an anode, a suppressor grid, a screen grid, a control grid, and a cathode contained therein, lead-in conductors provided for each of said elements and arranged in first and second groups spaced from each other, said first group comprising said control grid and at least one of said cathode lead-in conductors, said second group comprising said anode, said suppressor grid and said screen grid lead-in conductors, said anode and said control grid lead-in conductors being arranged in diametrically opposed relation, and said anode and said screen grid lead-in conductors having at least one other lead-in conductor interposed therebetween.

References Cited in the file of this patent

UNITED STATES PATENTS

| | | |
|---|---|---|
| 2,337,401 | Miller | Dec. 21, 1943 |
| 2,346,913 | Depew | Apr. 18, 1944 |
| 2,400,011 | Liebmann | May 7, 1946 |

FOREIGN PATENTS

| | | |
|---|---|---|
| 477,314 | Canada | Sept. 25, 1951 |